United States Patent
Lamarre et al.

(10) Patent No.: US 12,450,723 B2
(45) Date of Patent: Oct. 21, 2025

(54) SYSTEM AND METHOD FOR IDENTIFYING GEOMETRIC FEATURE ASSOCIATIONS FOR 3D MODELS

(71) Applicant: Pratt & Whitney Canada Corp., Longueuil (CA)

(72) Inventors: Simon G. Lamarre, Saint-Constant (CA); Clement Drouin Laberge, Terrebone (CA); Alain Baron, Carignan (CA)

(73) Assignee: Pratt & Whitney Canada Corp., Longueuil (CA)

( * ) Notice: Subject to any disclaimer, the term of this patent is extended or adjusted under 35 U.S.C. 154(b) by 150 days.

(21) Appl. No.: 17/986,575

(22) Filed: Nov. 14, 2022

(65) Prior Publication Data
US 2024/0161269 A1    May 16, 2024

(51) Int. Cl.
*G06T 7/00* (2017.01)
*G06F 30/12* (2020.01)
(Continued)

(52) U.S. Cl.
CPC .............. *G06T 7/001* (2013.01); *G06F 30/12* (2020.01); *G06T 17/20* (2013.01); *G06T 19/20* (2013.01); *G06T 2207/20221* (2013.01); *G06T 2207/30108* (2013.01); *G06T 2219/004* (2013.01); *G06T 2219/012* (2013.01); *G06T 2219/2004* (2013.01)

(58) Field of Classification Search
CPC ......... G06T 7/001; G06T 17/20; G06T 19/20; G06T 2207/20221; G06T 2207/30108; G06T 2219/004; G06T 2219/012; G06T 2219/2004; G06F 30/12; G06F 30/17
See application file for complete search history.

(56) References Cited

U.S. PATENT DOCUMENTS

| | | |
|---|---|---|
| 10,372,109 B2 | 8/2019 | Desimone |
| 10,921,779 B2 | 2/2021 | Amer |

(Continued)

FOREIGN PATENT DOCUMENTS

| | | |
|---|---|---|
| EP | 3588218 A1 | 1/2020 |
| KR | 101879427 B1 | 7/2018 |

OTHER PUBLICATIONS

Cicconi et al., "An approach to support model based definition by PMI annotations", Computer-Aided Design and Applications, vol. 14, No. 4, Jun. 7, 2017, pp. 526-534.

(Continued)

*Primary Examiner* — William A Beutel
(74) *Attorney, Agent, or Firm* — Getz Balich LLC

(57) ABSTRACT

A method for identifying a geometric feature association for a 3D component model and a 3D manufacturing model is provided. The method includes superimposing the 3D manufacturing model on the 3D component model in a computer-aided drafting (CAD) environment, identifying correspondence between a first geometric feature of the 3D component model and a second geometric feature of the superimposed 3D manufacturing model, measuring at least one distance between the first geometric feature and the second geometric feature, and identifying an association between the first geometric feature and the second geometric feature based on the at least one measured distance.

19 Claims, 11 Drawing Sheets

(51) Int. Cl.
*G06T 17/20* (2006.01)
*G06T 19/20* (2011.01)

(56) References Cited

U.S. PATENT DOCUMENTS

| | | | |
|---|---|---|---|
| 11,574,084 B1* | 2/2023 | Marusich | G06F 30/17 |
| 11,687,687 B1* | 6/2023 | Usui | G06F 30/17 |
| | | | 703/7 |
| 2003/0114945 A1* | 6/2003 | Hirano | G05B 19/4097 |
| | | | 700/182 |
| 2016/0019270 A1 | 1/2016 | Jones | |
| 2018/0025484 A1* | 1/2018 | Burton | G06T 17/205 |
| | | | 382/141 |
| 2018/0330042 A1* | 11/2018 | Byers | G06F 30/17 |

OTHER PUBLICATIONS

EP Search Report for EP Patent Application No. 23209855.8 dated Apr. 8, 2024.

\* cited by examiner

SYSTEM AND METHOD FOR IDENTIFYING GEOMETRIC FEATURE ASSOCIATIONS FOR 3D MODELS

TECHNICAL FIELD

This disclosure relates generally to component manufacturing process development, and more particularly to systems and methods for identifying associations between geometric features of different 3D models.

BACKGROUND OF THE ART

Designing components and component manufacturing processes may include the use of computer-implemented 3D models. Various systems and methods are known in the art for generating, manipulating, and otherwise using 3D models. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for identifying a geometric feature association for a 3D component model and a 3D manufacturing model is provided. The method includes superimposing the 3D manufacturing model on the 3D component model in a computer-aided drafting (CAD) environment, identifying correspondence between a first geometric feature of the 3D component model and a second geometric feature of the superimposed 3D manufacturing model, measuring at least one distance between the first geometric feature and the second geometric feature, and identifying an association between the first geometric feature and the second geometric feature based on the at least one measured distance.

In any of the aspects or embodiments described above and herein, the method may further include applying product manufacturing information (PMI) associated with the first geometric feature to the second geometric feature based on the identified association.

In any of the aspects or embodiments described above and herein, superimposing the 3D manufacturing model on the 3D component model may include aligning a third geometric feature of the 3D manufacturing model with a fourth geometric feature of the 3D component model.

In any of the aspects or embodiments described above and herein, the third geometric feature may be a center axis of the 3D manufacturing model and the fourth geometric feature is a center axis of the 3D component model.

In any of the aspects or embodiments described above and herein, identifying correspondence between the first geometric feature of the 3D component model and the second geometric feature of the superimposed 3D manufacturing model may include generating a search box positioned on the second geometric feature and identifying that the first geometric feature is located within the search box.

In any of the aspects or embodiments described above and herein, measuring the at least one distance between the first geometric feature and the second geometric feature may include overlaying a mesh pattern on the first geometric feature, wherein the mesh pattern includes a plurality of mesh points, and measuring a vector distance from each mesh point of the plurality of mesh points to the second geometric feature.

In any of the aspects or embodiments described above and herein, identifying the association between the first geometric feature and the second geometric feature may include identifying that the measured at least one distance is less than a final manufacturing tolerance for a component represented by the 3D component model.

In any of the aspects or embodiments described above and herein, identifying the association between the first geometric feature and the second geometric feature may include identifying that the measured at least one distance is greater than a final manufacturing tolerance for a component represented by the 3D component model.

In any of the aspects or embodiments described above and herein, the method may further include indexing the first geometric feature in a database by assigning the first geometric feature a unique ID.

In any of the aspects or embodiments described above and herein, each of the first geometric feature and the second geometric feature may be a surface.

According to another aspect of the present disclosure, a system for identifying a geometric feature association for a 3D component model and a 3D manufacturing model is provided. The system includes a processor and a non-transitory memory in signal communication with the processor. The non-transitory memory stores instructions which, when executed, cause the processor to: superimpose the 3D manufacturing model on the 3D component model in a computer-aided drafting (CAD) environment, measure at least one distance between a first geometric feature of the 3D component model and a second geometric feature of the superimposed 3D manufacturing model, and identify an association between the first geometric feature and the second geometric feature based on the at least one measured distance and a final manufacturing tolerance for a component represented by the 3D component model.

In any of the aspects or embodiments described above and herein, the non-transitory memory may further store a plurality of 3D models including the 3D component model and the 3D manufacturing model.

In any of the aspects or embodiments described above and herein, the system may further include a database in signal communication with the processor. The database may store manufacturing data for the first geometric feature. The instructions, when executed, may further cause the processor to identify the manufacturing data first geometric feature using a unique ID assigned to the geometric feature.

In any of the aspects or embodiments described above and herein, the instructions, when executed, may further cause the processor to identify correspondence between the first geometric feature of the 3D component model and the second geometric feature of the superimposed 3D manufacturing model prior to measuring the at least one distance.

In any of the aspects or embodiments described above and herein, identifying correspondence between the first geometric feature of the 3D component model and the second geometric feature of the superimposed 3D manufacturing model may include generating a search box centered on the second geometric feature and identifying that the first geometric feature is located within the search box.

According to another aspect of the present disclosure, a method for identifying a geometric feature association for a 3D component model and a 3D manufacturing model is provided. The 3D component model includes a plurality of first geometric features. The 3D manufacturing model including a plurality of second geometric features. The method includes superimposing the 3D manufacturing model on the 3D component model in a computer-aided drafting (CAD) environment, identifying correspondence for each second geometric feature by positioning a search box on each second geometric feature and identifying one or more first geometric features located within the search box for each second geometric feature, measuring, for each second geometric feature, at least one distance between the respective second geometric feature and any identified corresponding first geometric features for the respective second geometric feature, and identifying, for each second geometric feature, an association between the respective second geometric feature and the any identified corresponding first geometric features for the respective second geometric feature based on the at least one measured distance.

In any of the aspects or embodiments described above and herein, each second geometric feature may be a surface.

In any of the aspects or embodiments described above and herein, each first geometric feature of the plurality of first geometric features may be identified in a database by a respective unique ID.

In any of the aspects or embodiments described above and herein, measuring the at least one distance between the respective second geometric feature and the any identified corresponding first geometric features for the respective second geometric feature may include overlaying a mesh pattern on each of the any identified corresponding first geometric features, the mesh pattern including a plurality of mesh points and measuring a vector distance from each mesh point of the plurality of mesh points to the second geometric feature.

In any of the aspects or embodiments described above and herein, identifying the association between the respective second geometric feature and the any identified corresponding first geometric features for the respective second geometric feature may include identifying that the measured at least one distance is less than a final manufacturing tolerance for a component represented by the 3D component model.

In any of the aspects or embodiments described above and herein, identifying the association between the respective second geometric feature and the any identified corresponding first geometric features for the respective second geometric feature may include identifying that the measured at least one distance is greater than a final manufacturing tolerance for a component represented by the 3D component model.

The present disclosure, and all its aspects, embodiments and advantages associated therewith will become more readily apparent in view of the detailed description provided below, including the accompanying drawings.

DETAILED DESCRIPTION

Figure 1:
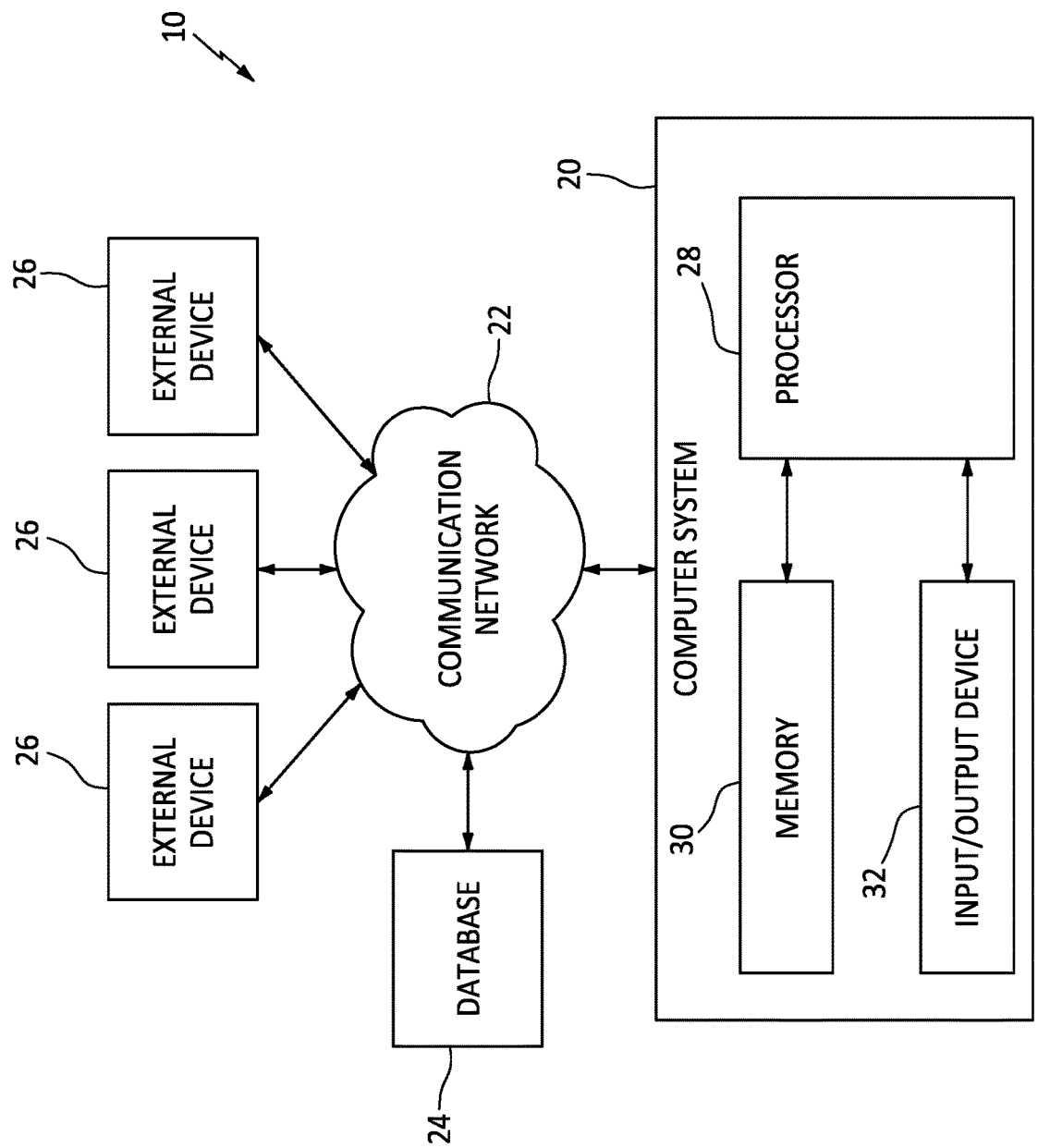
FIG. 1 illustrates a schematic block diagram of an exemplary computer system, in accordance with one or more embodiments of the present disclosure.

FIG. 1 illustrates a diagram of an exemplary computer network 10. The computer network 10 of FIG. 1 includes a computer system 20, a communication network 22, a database 24, and one or more external devices 26. The computer network 10 of FIG. 1 may be configured to implement one or more aspects of the present disclosure, however, the present disclosure is not limited to the particular computer network 10 of FIG. 1. A person of skill in the art will recognize that portions of the computer network 10 may assume various forms (e.g., digital signal processor, analog device, etc.) capable of performing the functions described herein.

The computer system 20 of FIG. 1 includes a processor 28, memory 30, and one or more input/output devices 32. The memory 30 is in signal communication with the processor 28. The processor 28 may include any type of computing device, computational circuit, or any type of process or processing circuit capable of executing a series of instructions that are stored in the memory 30, thereby causing the processor 28 to perform or control one or more steps or other processes. The processor 28 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 30 may represent one or more algorithms for controlling aspects of the computer network 10 and/or the computer system 20, and the stored instructions are not limited to any particular form (e.g., program files, system data, buffers, drivers, utilities, system programs, etc.) provided they can be executed by the processor 28. The memory 30 may be a non-transitory computer readable storage medium configured to store instructions that when executed by one or more processors, cause the one or more processors to perform or cause the performance of certain functions. The memory 30 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the computer system 20 may be achieved via the use of hardware, software, firmware, or any combination thereof.

The one or more input/output devices 32 are in signal communication with the processor 28. Communications between the processor 28 and the one or more input/output devices 32 may be via a hardwire connection or via a wireless connection. The one or more input/output devices 32 may include one or more input devices configured, for example, to enable a user to enter data and/or instructions to the computer system 20. Examples of an input device may include, but are not limited to, a keyboard, a mouse, a touchscreen, and a 3D laser scanning system. The one or more input/output devices 32 may additionally or alternatively include one or more output devices configured, for example, to display information or to transfer data from the computer system 20. Examples of an output device may include, but are not limited to, a computer monitor or other optical display, a printer, and audio speakers.

The computer system 20 of the present disclosure may be configured to implement a computer-aided drafting (CAD) and/or a computer-aided manufacturing (CAM) system, platform, and/or software (referred to herein as a "CAD environment") which is capable of importing, generating, manipulating, and assembling three-dimensional (3D) models of an object (e.g., a component) in a simulated 3D space. The present disclosure is not limited to any particular CAD or CAM system, platform, or software. The 3D model may be a mathematical coordinate-based representation of the geometric features of an object in three dimensions. Examples of geometric features may include, but are not limited to, surfaces, edges, vertices, and volumes of an object. The 3D model may be generated algorithmically (e.g., by procedural modeling), by scanning a physical object, or by any other suitable process for obtaining data for representing the 3D shape of an object in the CAD environment. The 3D model may be defined by a solid model or by a shell or boundary model using any suitable representation technique including, but not limited to, boundary definition representation, point cloud representation, and the like.

The communication network 22 of FIG. 1 is configured to facilitate signal communication between the components of the computer network 10 including, for example, the computer system 20, the database 24, and the one or more external devices 26. The communication network 22 may include any suitable electronic communication network or combination of electronic communication networks including, but not limited to, wired and/or wireless local area networks, internet-based networks, cloud-based storage and communication networks, and the like. The communication network 22 may allow remote electronic communications between the computer system 20 and one or more devices such as, but not limited to, the database 24 and/or the one or more external devices 26.

The database 24 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The database 24 of FIG. 1 is in signal communication with the components of the computer network 10 such as, but not limited to, the computer system 20 and the one or more external devices 26, via the communication network 22. The database 24 may, thereby, facilitate access to stored instructions and data from multiple components of the computer network 10 such as, but not limited to, the computer system 20 and the one or more external devices 26. The database 24 of FIG. 1 is located external to the computer system 20. Alternatively, the database 24 may be integral to the computer system 20. For example, the database 24 may be integrated with the memory 30.

The one or more external devices 26 may include, for example, one or more computer workstations which may be similar to the computer system 20 of FIG. 1. The one or more external devices 26 may be configured to operate CAD or CAM software capable of generating, manipulating, and assembling three-dimensional (3D) models of an object (e.g., a component) in a simulated 3D space. The one or more external devices 26 may include manufacturing equipment, inspection equipment, and the like. Examples of manufacturing equipment may include additive, subtractive, and/or inspection computer numerical control (CNC) or numerical control (NC) manufacturing equipment such as, but not limited to, multi-axis milling equipment, grinding equipment, turning equipment, drilling equipment, broaching equipment gear cutting equipment wire electrical discharge machining (WEDM) equipment, additive manufacturing equipment, component casting equipment, injection molding equipment, and the like. Examples of inspection equipment may include, but are not limited to, probe inspection equipment, coordinate measuring machines (CMM), optical scanning equipment, laser scanning equipment, pneumatic gauging equipment, and the like. The manufacturing equipment and the inspection equipment may be configured to access or receive the 3D models and perform one or more manufacturing or inspection steps using the information defined by or included with the 3D models.

Figure 2:
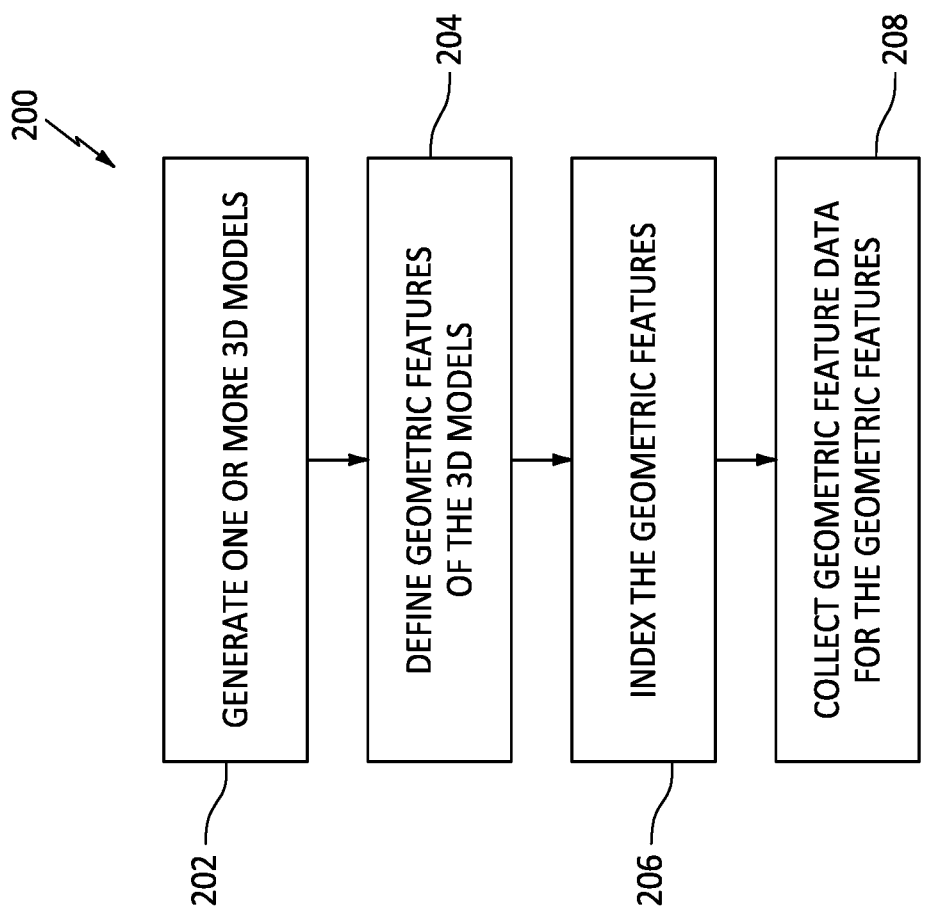
FIG. 2 illustrates a flowchart depicting a method for developing 3D models for an object, in accordance with one or more embodiments of the present disclosure.

Referring to FIGS. 2-8, a method 200 for developing 3D models for an object (e.g., a component) is provided. FIG. 2 illustrates a flow chart for the method 200. For ease of description, the method 200 is described below with reference to the computer network 10 of FIG. 1. For example, the memory 30 may include instructions which, when executed by the processor 28, cause the computer system 20 or its processor 28 to perform one or more steps of the method 200. The method 200, however, may alternatively be performed with other computer network or computer system configurations. Unless otherwise noted herein, it should be understood that the steps of method 200 are not required to be performed in the specific sequence in which they are discussed below and, in various embodiments, the steps of method 200 may be performed separately or simultaneously.

Further, it should be understood that not all of the steps of the method 200, discussed below, may be required unless otherwise described herein.

Step 202 includes generating, providing, or otherwise obtaining one or more 3D models 34 in a CAD environment, which CAD environment may be implemented, for example, by the computer system 20 (see FIG. 1). The 3D models 34 may include 3D component models 36 and/or 3D manufacturing models 38. As used herein, the term "3D component model" may be understood to refer to a 3D model which is representative of an object (e.g., a component) in its fully formed and/or manufactured condition. As used herein, the term "3D manufacturing model" may be understood to refer to a 3D model which is representative of an object (e.g., a component) in an intermediate state of formation or manufacture. Generation of the 3D models 34 in the CAD environment may be performed, for example, as part of a design process for a component and/or a development process for one or more manufacturing stages for the component. The 3D models 34 may be stored, for example, in the database 24 and/or memory 30 for access by one or more components of the computer network 10 (see FIG. 1).

Figure 3:
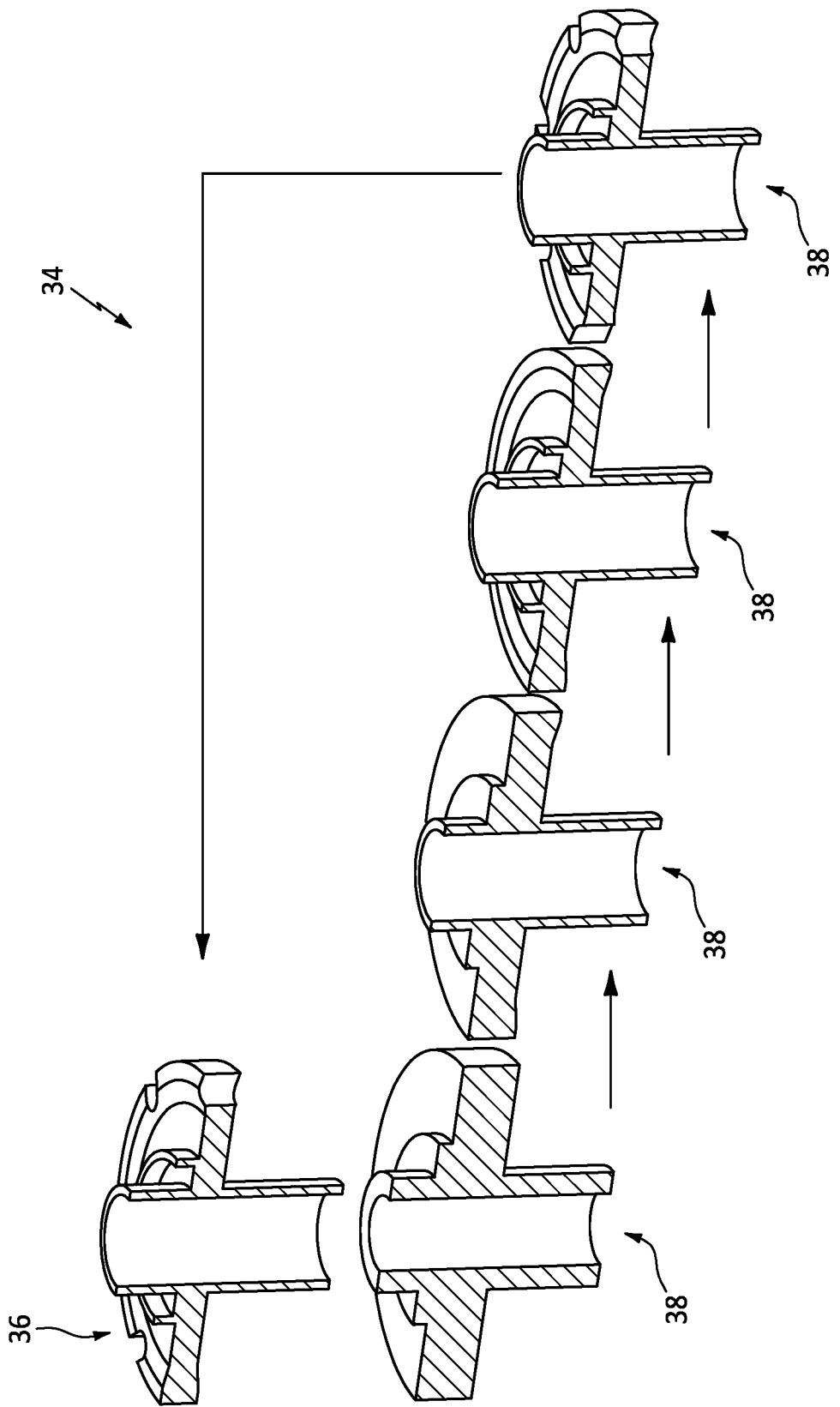
FIG. 3 illustrates perspective views of a 3D component model and a plurality of related 3D manufacturing models, in accordance with one or more embodiments of the present disclosure.

FIG. 3 illustrates an exemplary 3D component model 36 and a plurality of 3D manufacturing models 38. The plurality of 3D manufacturing models 38 are representative of a sequence of manufacturing stages for manufacturing a component represented by the 3D component model 36. For example, each of the 3D manufacturing models 38 may be representative of a component following the application of one or more manufacturing processes such as, but not limited to, a turning process, a milling process, a grinding process, a drilling process, a broaching process, a gear cutting process, a wire electrical discharge machining (WEDM) process, an additive manufacturing process, a casting process, an injection molding process, a polishing process, etc.

Figure 4:
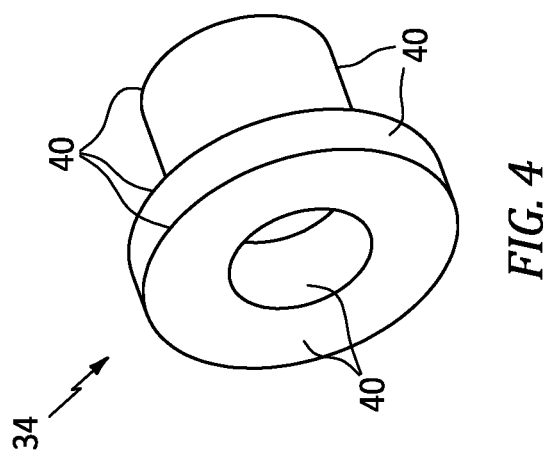
FIG. 4 illustrates a perspective view of a 3D model, in accordance with one or more embodiments of the present disclosure.

Step 204 may include defining geometric features 40 of a 3D model 34. The geometric features 40 may include, but are not limited to, surfaces, edges, points, lines, planes, volumes, etc. of the 3D model 34. For ease of description, the geometric features 40 may generally be described herein with respect to surfaces, however, it should be understood that geometric features 40 according to the present disclosure may include other types of component geometric features, for example, as described above. FIG. 4 illustrates a perspective view of an exemplary 3D model 34. The 3D model 34 of FIG. 4 includes a plurality of geometric features 40. The geometric features 40 of FIG. 4 include surfaces and edges of the 3D model 34.

Figure 5:
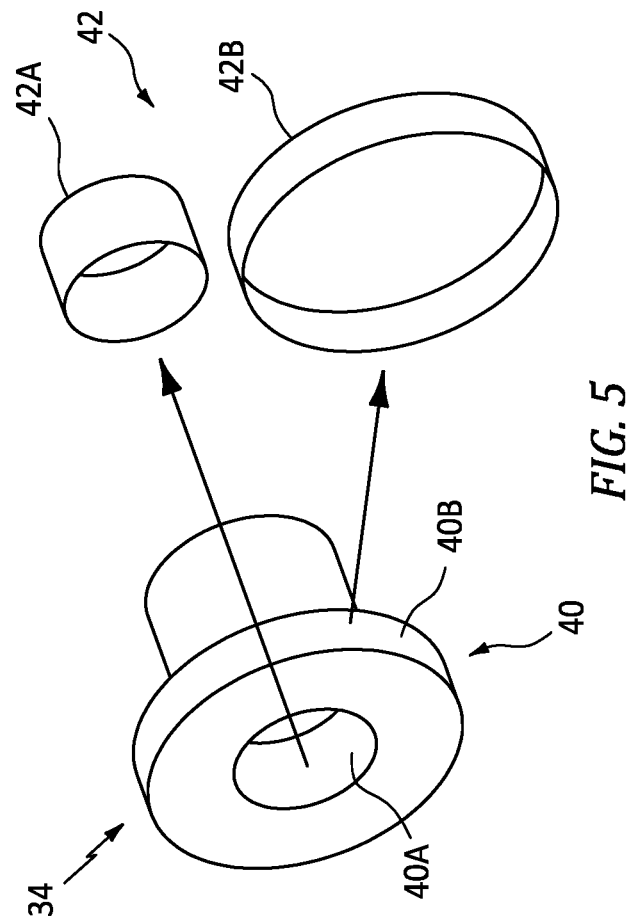
FIG. 5 illustrates a perspective view of a 3D model and a 3D surface representation model, in accordance with one or more embodiments of the present disclosure.

Step 204 may include extracting geometric feature 40 information from the 3D model 34 and generating one or more 3D geometric feature representation models 42. FIG. 5 illustrates a perspective view of the 3D model 34 of FIG. 4 and 3D geometric feature representation models 42. Each 3D geometric feature representation model 42 may be a representation of a respective geometric feature 40 of a 3D model 34, such as the 3D model 34 of FIGS. 4 and 5. As an example, the plurality of geometric features 40 of the 3D model 34 of FIG. 5 includes a first geometric feature 40A (e.g., a surface) and a second geometric feature 40B (e.g., a surface). Geometric feature information of the 3D model 34 for the first geometric feature 40A may be extracted to generate a first 3D geometric feature representation model 42A which is representative of the first geometric feature 40A. Similarly, geometric feature information of the 3D model 34 for the second geometric feature 40B may be extracted to generate a second 3D geometric feature representation model 42B which is representative of the second geometric feature 40B. The 3D geometric feature representation models 42 may be generated in the CAD environment and may be unique models which are independent of the associated 3D model 34. The 3D geometric feature representation models 42 may be stored, for example, in the database 24 and/or memory 30 (see FIG. 1) independent of the associated 3D model 34.

Figure 6:
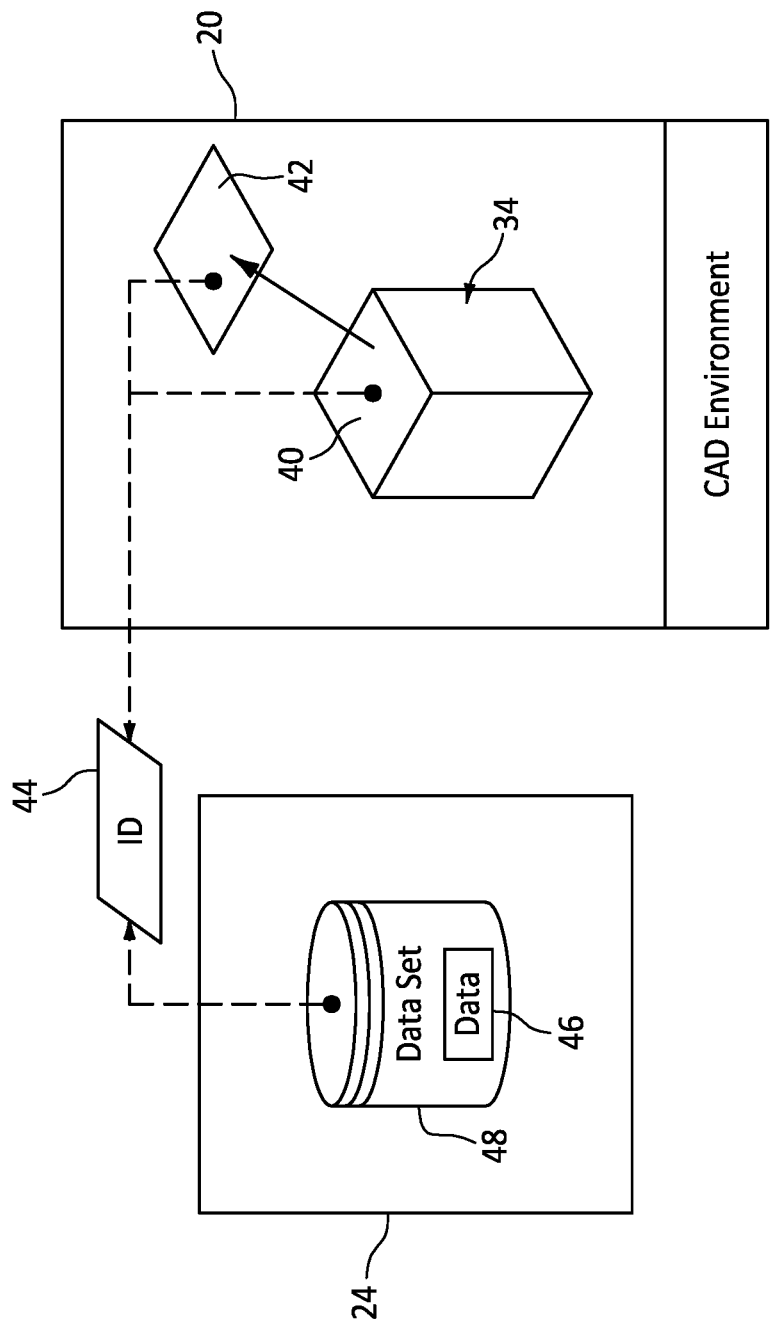
FIG. 6 illustrates a block diagram of a portion of the computer network of FIG. 1 including a 3D model, in accordance with one or more embodiments of the present disclosure.

Step 206 may include indexing or otherwise identifying the geometric features 40 defined, for example, in Step 204. Each geometric feature 40 of a 3D model 34 (e.g., a 3D component model 36, a 3D manufacturing model 38, etc.) may be indexed or identified based on one or more geometric feature characteristics of each geometric feature 40. For example, each geometric feature 40 may be assigned and be identified by a unique ID 44. FIG. 6 illustrates a 3D model 34 in the CAD environment. The 3D model 34 of FIG. 6 includes a geometric feature 40 which has been assigned a unique ID 44. The 3D geometric feature representation model 42 of FIG. 6, which is representative of the geometric feature 40, has also been assigned the unique ID 44. Geometric feature data 46 associated with the geometric feature 40 may be stored in a data set 48 which is linked to the unique ID 42 for the geometric feature 40. The data set 48 may be stored, for example, in the database 24 and/or memory 30 (see FIG. 1). Accordingly, the geometric feature 40 may be indexed to geometric feature data 46 associated with the geometric feature 40 by the unique ID 44. Each geometric feature 40 of a 3D model 34, such as the 3D model 34 of FIG. 6, may be indexed to a respective data set 48 by a respective unique ID 44 which is different than the unique ID 44 for each other geometric feature 40 of the 3D model 34. Indexing and/or identification of a geometric feature 40 may additionally or alternatively be accomplished using an industrial standard, such as the Quality Information Framework (QIF) and/or by using Universally Unique Identifiers (UUID), and/or based on other characteristics of the geometric feature 40 (e.g., diameter, thickness, width, function, etc.). The present disclosure is not limited to any particular standard or system for indexing or otherwise identifying geometric features 40.

In Step 208, geometric feature data 46 for a geometric feature 40 may be collected. The geometric feature data 46 may include manufacturing data. The manufacturing data may be collected, for example, during, after, or in connection with the performance of one or more manufacturing processes for a geometric feature of a component, which geometric feature of the component may be represented by a respective geometric feature 40 of a 3D model 34. The manufacturing data for the geometric feature 40 may be stored with the geometric feature data 46 in the data set 48 for the geometric feature 40 (see FIG. 6). Manufacturing data for each geometric feature 40 of a 3D model 34 may be collected during the manufacturing of a component represented by the 3D model 34. Manufacturing data may include any useful data associated with the geometric feature 40. The manufacturing data may include product manufacturing information (PMI). The PMI may include geometric dimensioning and tolerancing (GD&T) information for the geometric feature 40. The GD&T information may describe the nominal geometry of the geometric feature 40, the allowable manufacturing tolerance variation for the geometric feature 40, and manufacturing tolerances (e.g., in-process manufacturing tolerances, final manufacturing tolerances, etc.) for the geometric feature 40. The GD&T information may describe geometric characteristics for the geometric feature 40. Examples of GD&T information include geometric characteristics of the geometric feature 40 such as, but not limited to, dimensions (e.g., length, width, height), flatness, circularity, cylindricity, angularity, concentricity, coincidence, parallelism, perpendicularity, and the like, as well as acceptable manufacturing tolerance limits for each geometric characteristic. The GD&T information may conform to one or more GD&T standards including, but not limited to, the American Society of Mechanical Engineers (ASME) Y14.5 standard, the International Organization for Standardization (ISO) standard, and the like. The PMI may include functional and/or contextual information for the geometric feature 40 such as, but not limited to, stress peak area, airflow direction along the geometric feature 40, stack-up information (e.g., bearing stack-up information), design notes, etc. The PMI may include life cycle information for the geometric feature 40, such as, but not limited to, repair history, failure history, inspection history, and/or information gathered during component and/or equipment operation which may be used for future part design.

The manufacturing data may also include, for example, process capability (Cpk) data and/or process performance (Ppk) data associated with a manufacturing process for components which include a geometric feature represented by the geometric feature 40. The Cpk is a statistical tool which may be used to measure the ability of a manufacturing process to produce components or component geometric features within specification limits with a high confidence. Ppk is another statistical tool which may be used to determine how the actual manufacturing process has performed over a period of time with respect to producing components or component geometric features within specification limits with a high confidence. For example, a Cpk or Ppk value of 1.33 for the geometric feature 40 may indicate that 99.99% of instances of the geometric feature 40 are within or likely to be within specification limits, a Cpk or Ppk value of 1.2 for the common geometric feature 40 may indicate that 99.97% of instances of the geometric feature 40 are within or likely to be within specification limits, a Cpk or Ppk value of 1.0 for the geometric feature 40 may indicate that 99.7% of instances of the geometric feature 40 are within or likely to be within specification limits, etc. A Cpk or Ppk value above a predetermined threshold value may confirm that the manufacturing process for the common geometric feature 40 is acceptable for use in manufacturing the geometric feature 40.

The manufacturing data may include or describe functional details of a manufacturing process and its performance for the geometric feature 40. For example, the manufacturing data may include one or more steps of the manufacturing process associated with the geometric feature 40. The manufacturing data may include, for example, computer-aided manufacturing (CAM) and/or numerical control (NC) manufacturing instructions associated with the geometric feature 40. Computer-aided manufacturing and/or numerical control manufacturing instructions may include computer-readable instructions which, when executed by one or more numerically-controlled manufacturing devices (e.g., additive, subtractive, and/or inspection numerically-controlled manufacturing devices), cause the one or more numerically-controlled manufacturing devices to execute one or more manufacturing processes. Execution of the numerical control manufacturing instructions may cause one or more numerically-controlled manufacturing devices to execute positioning, movement, and/or coordinated manufacturing operations by means of program data in numerical form (e.g., numerical coordinates). For example, the numerical control manufacturing instructions may be in the form of computer numerical control (CNC) G-code or M-code. The manufacturing data may additionally or alternatively include characteristics of the manufacturing process steps or sequence such as, but not limited to, manufacturing sequences, machine tool paths, machining depths, additive manufacturing build heights, inspection probe coordinates and acceptability tolerances, and the like. The manufacturing data may additionally or alternatively include structural or operational characteristics of the manufacturing equipment configured to execute the manufacturing process such as, but not limited to, tool force, torque, power, deflection, temperature, speed, feed rate, vibration, tool coolant temperatures and coolant flow requirements, tooling specifications (e.g., size and/or diameter), and the like.

Figure 7:
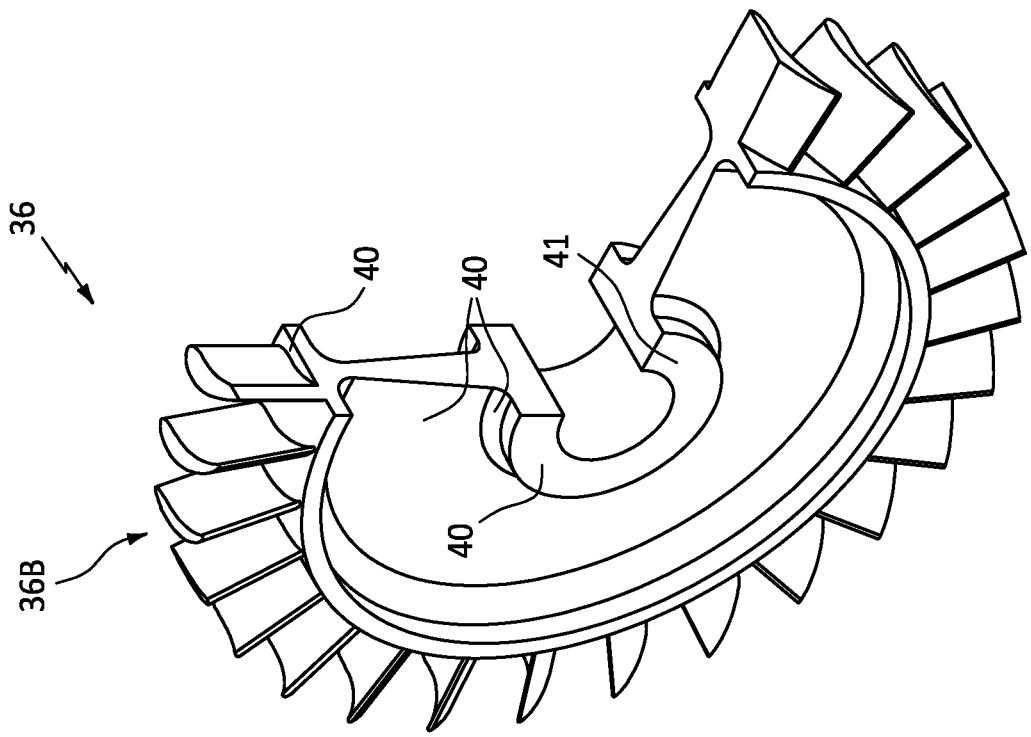
FIG. 7 illustrates perspective cutaway views of two different 3D models, in accordance with one or more embodiments of the present disclosure.
Figure 7:
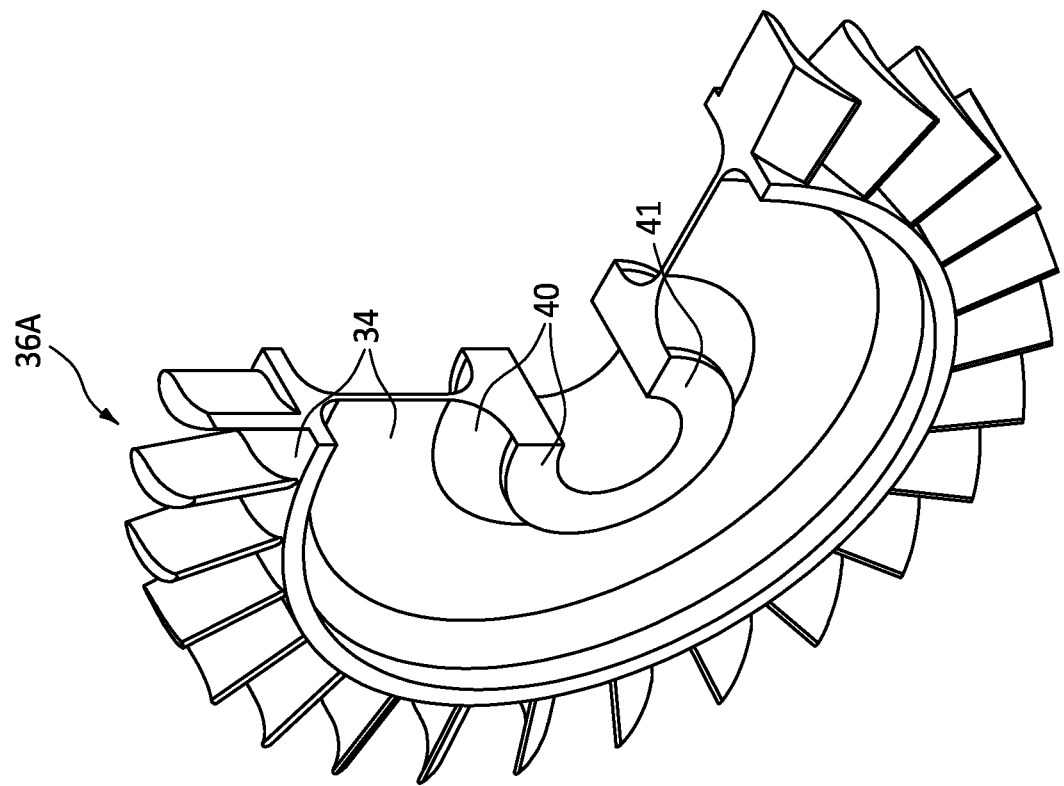

Indexing or otherwise identifying the geometric features 40 of a 3D model 34 may allow the geometric feature data 46 associated with any geometric feature 40 to be used for any 3D model 34 which includes that geometric feature 40. As an example, FIG. 7 illustrates cutaway, perspective views of exemplary 3D component models 36 including a first 3D component model 36A and a second 3D component model 36B. The first 3D component model 36A and the second 3D component model 36B of FIG. 7 are representative of bladed disks (e.g., rotors) which may be used, for example, in a compressor or turbine of a gas turbine engine. However, it should be understood that the 3D models 34 of the present disclosure are not limited to representation of any particular type of component. Each of the first 3D component model 36A and the second 3D component model 36B of FIG. 7 include a plurality of geometric features 40.

As can be seen in FIG. 7, the first 3D component model 36A and the second 3D component model 36B are different from one another. In other words, the first 3D component model 36A includes one or more geometric features 40 which are different from or otherwise not included in the second 3D component model 36B, and vice versa. However, the first 3D component model 36A and the second 3D component model 36B also include one or more geometric features 40 which are common to both the first 3D component model 36A and the second 3D component model 36B.

Each geometric feature 40 of a 3D model 34 may be unique to the particular 3D model 34 or may be common to two or more different 3D model 34 (e.g., common geometric features 41). As used herein, the term "common geometric feature" refers to a geometric feature 40 (e.g., a surface) of a 3D model 34 which is the same as or similar to another geometric feature 40 of another different 3D model 34, based on one or more predetermined similarity rules. For example, a common geometric feature may include one or more geometric feature characteristics (e.g., diameter, thickness, width, etc.) which are the same or within a predetermined geometric characteristic threshold for two or more different 3D models 34. The common geometric feature may additionally or alternatively be determined or otherwise identified based on similar geometric feature characteristics such as, but not limited to, fit, form, function, position, tolerance, surface finish, geometric feature angles, radius of curvature, etc. for two or more different 3D models 34. The common geometric feature for two or more different 3D models 34 may be identical or substantially identical. Any number of the geometric features 40 of a 3D model 34 may be identified as common geometric features.

Figure 8:
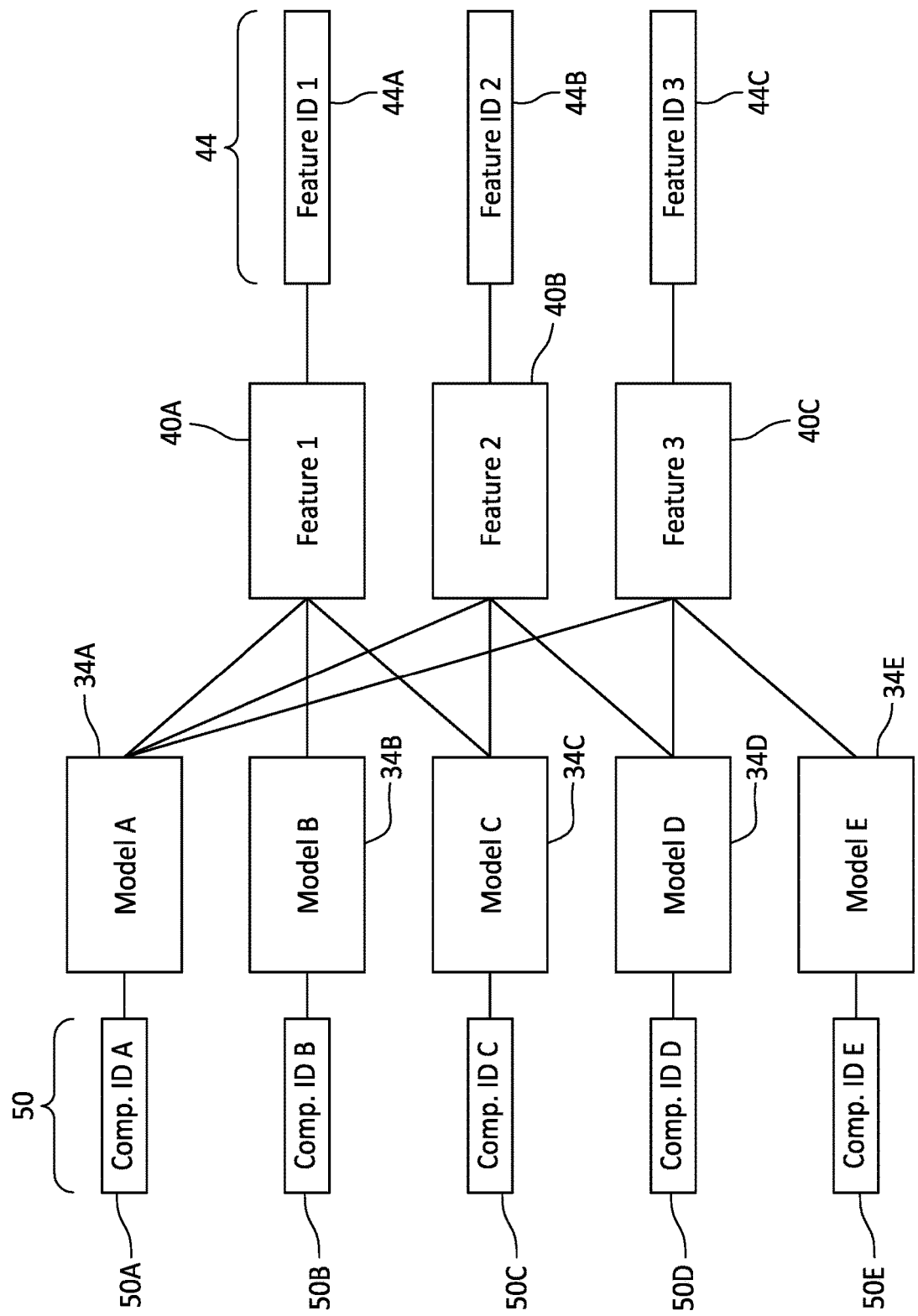
FIG. 8 illustrates a block diagram depicting an exemplary relationship between a series of 3D models, in accordance with one or more embodiments of the present disclosure.

FIG. 8 illustrates a block diagram depicting an exemplary relationship between a series of exemplary 3D models 34A-E. Each of the 3D models 34A-E may be identified by a component ID 50 (e.g., a part number), which component ID 50 may identify a particular component design with which the respective 3D model 34A-E is associated. For example, the 3D models 34A-E of FIG. 8 are each identified by a respective component ID 50A-E. 3D models 34A, 34B, and 34C each include a first geometric feature 40A. The first geometric feature 40A, therefore, is a common geometric feature for 3D models 34A, 34B, and 34C. 3D models 34D and 34E do not include the first geometric feature 40A. 3D models 34A, 34C, and 34D each include a second geometric feature 40B. The second geometric feature 40B, therefore, is a common geometric feature for 3D models 34A, 34C, and 34D. 3D models 34B and 34E do not include the second geometric feature 40B. 3D models 34A, 34D, and 34E each include a third geometric feature 40C. The third geometric feature 40C, therefore, is a common geometric feature for 3D models 34A, 34D, and 34E. 3D models 34B and 34C do not include the third geometric feature 40C. Each geometric features 40 may be identified by a unique ID 44, which unique ID 44 is unique to the respective geometric feature 40. For example, each of the geometric features 40A-C of FIG. 8 is identified by a respective unique ID 44A-C. As can be understood from FIG. 8, the occurrence of manufacturing processes to form certain geometric features 40 (e.g., common geometric features) associated with various components may be significantly more common than occurrences of performing manufacturing processes on a particular component. This is because a common geometric feature may be found in a large number of different components.

Figure 9:
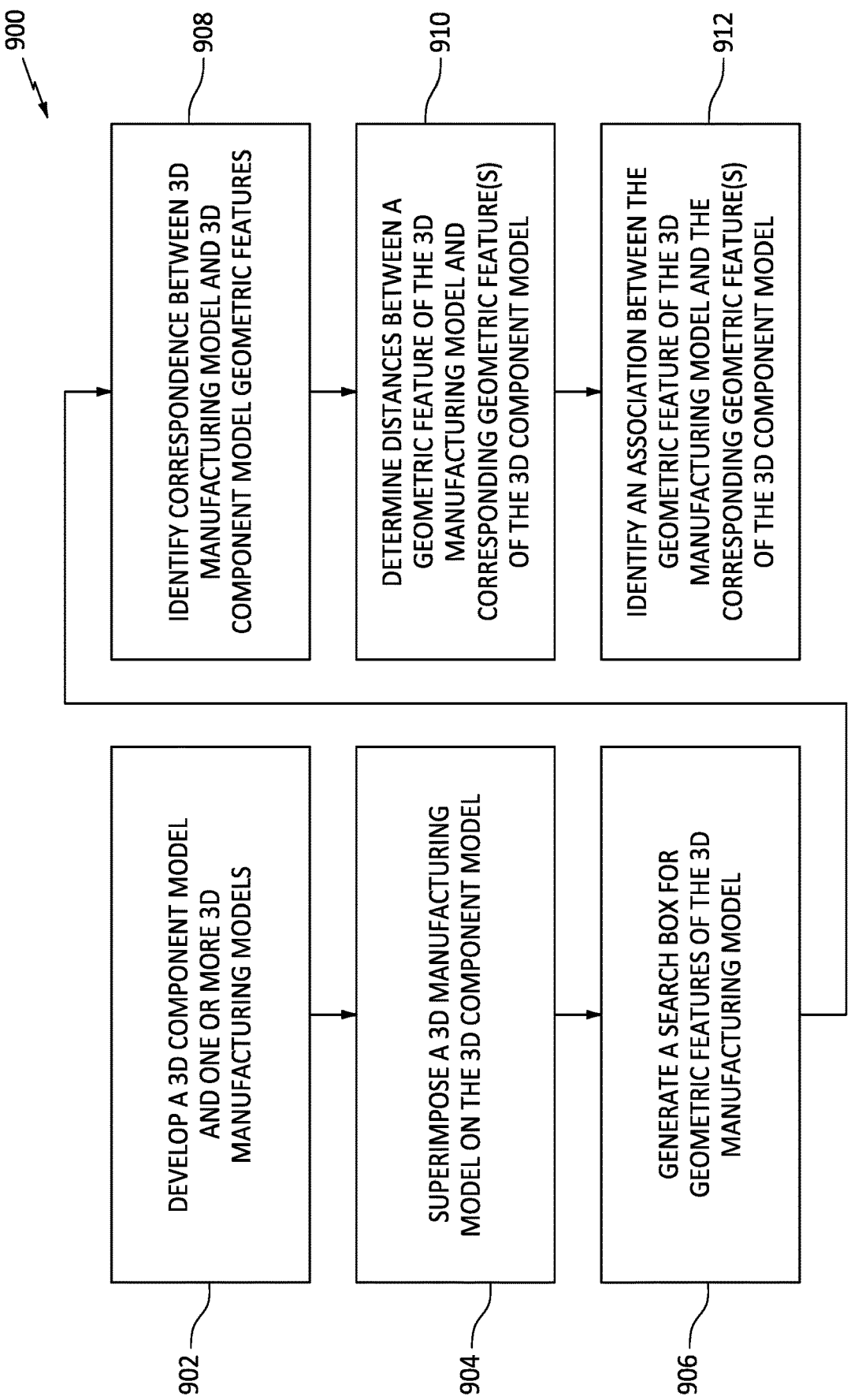
FIG. 9 illustrates a flowchart depicting a method for identifying geometric feature association for a 3D component model and a 3D manufacturing model, in accordance with one or more embodiments of the present disclosure.

Referring to FIGS. 9-12, a method 900 for identifying a geometric feature (e.g., surface) association for a 3D component model (e.g., 3D component model 36) and a 3D manufacturing model (e.g., 3D manufacturing model 38) is provided. FIG. 9 illustrates a flow chart for the method 900. For ease of description, the method 900 is described below with reference to the computer network 10 of FIG. 1. For example, the memory 30 may include instructions which, when executed by the processor 28, cause the computer system 20 or its processor 28 to perform one or more steps of the method 900. The method 900, however, may alternatively be performed with other computer network or computer system configurations. Unless otherwise noted herein, it should be understood that the steps of method 900 are not required to be performed in the specific sequence in which they are discussed below and, in various embodiments, the steps of method 900 may be performed separately or simultaneously. Further, it should be understood that not all of the steps of the method 900, discussed below, may be required unless otherwise described herein.

Step 902 may include developing a 3D component model 36 and one or more 3D manufacturing models 38 in the CAD environment for a same or similar object (e.g., component) (see FIG. 3). Development of the 3D component model 36 and/or the 3D manufacturing models 38 may be performed, for example, using one or more of the steps or aspects discussed above with respect to the method 200. The present disclosure, however, is not limited to the above discussed steps or aspects of the method 200 for developing the 3D component model 36 and/or the 3D manufacturing models 38. As discussed above, the term "3D component model" may be understood to refer to a 3D model which is representative of an object (e.g., a component) in its fully formed and/or manufactured condition and the term "3D manufacturing model" may be understood to refer to a 3D model which is representative of the object (e.g., the component) in an intermediate state of formation or manufacture.

Figure 10:
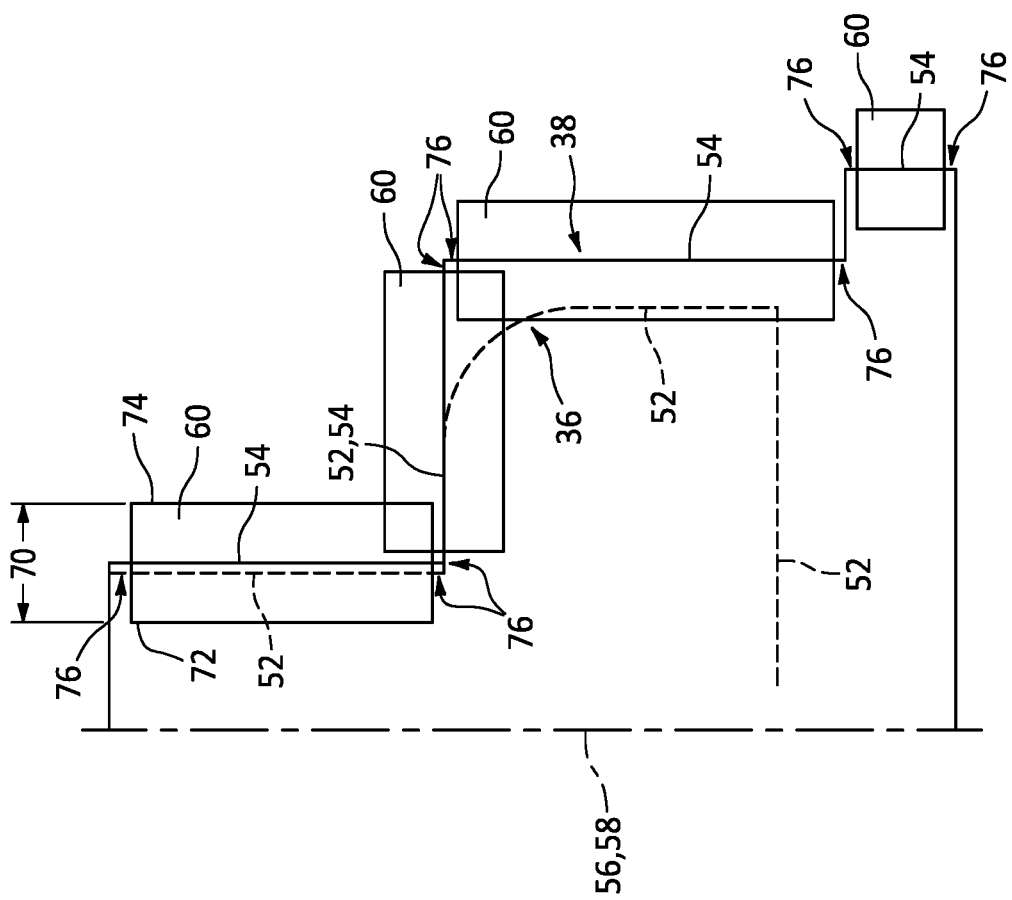
FIG. 10 illustrates a side, cutaway view of superimposed portions of a 3D component model and a 3D manufacturing model, in accordance with one or more embodiments of the present disclosure.

Step 902 may include defining or otherwise identifying geometric features 40 of each of the 3D component model 36 and the 3D manufacturing models 38 (see FIG. 4; Step 204). FIG. 10 illustrates a sectional view of a portion of a 3D component model 36 and a portion of a 3D manufacturing model 38. Geometric features 52 (e.g., surfaces) of the 3D component model 36 of FIG. 10 are illustrated by dashed lines. Geometric features 54 (e.g., surfaces) of the 3D manufacturing model 38 of FIG. 10 are illustrated by solid lines.

Step 904 may include superimposing the 3D component model 36 and one of the 3D manufacturing models 38 in the CAD environment. FIG. 10 illustrates a portion of the 3D manufacturing model 38 superimposed on a corresponding portion of the 3D component model 36. Constraints of the degree of freedom between the 3D component model 36 and the 3D manufacturing model 38 may be defined or otherwise established by a user. The 3D component model 36 and the 3D manufacturing model 38 may be aligned with one another in the CAD environment using one or more geometric features 52 of the 3D component model 36 and one or more geometric features 54 of the 3D manufacturing model 38 (e.g., based on coincidence, distance, angular orientation, or another relationship of the one or more geometric feature 52 and the one or more geometric features 54). For example, the 3D component model 36 and the 3D manufacturing model 38 may be aligned with one another using one or more surfaces, axes, edges, points, and the like for each of the 3D component model 36 and the 3D manufacturing model 38. The 3D component model 36 and the 3D manufacturing model 38 of FIG. 10 are aligned using a center axis 56 of the 3D component model 36 and a center axis 58 of the 3D manufacturing model 38. In other words, the 3D manufacturing model 38 is superimposed on the 3D component model 36 such that the center axis 56 and the center axis 58 are identical or substantially identical lines (e.g., coincident).

Step 906 may include generating a search box 60 for one or more geometric features 54 (e.g., surface) of the 3D manufacturing model 38. Each search box 60 may be positioned on a respective geometric feature 54 of the 3D manufacturing model 38. For example, FIG. 10 illustrates a plurality of search boxes 60 with each search box 60 centered on a respective one of the geometric features 54. Each search box 60 may include a search distance 70 extending between a minimum search end 72 and a maximum search end 74. The search distance 70 may be a user-defined parameter. The search distance 70 may be a function of, for example, a size of the 3D component model 36 and/or the 3D manufacturing model 38 (e.g., a part size), a manufacturing tolerance associated with the respective geometric feature 54, and/or a manufacturing method associated with the respective geometric feature 54. The search box 60 may be centered on geometric feature 54 such that half of the search distance 70 extends between the geometric feature 54 and the minimum search end 72 and half of the search distance 70 extends between the geometric feature 54 and the maximum search end 74. Generating each search box 60 may include applying a boundary exclusion 76 parameter to the search box 60. As will be discussed in further detail below, the boundary exclusion 76 may be applied to the geometric feature 54 to separate the search box 60 from boundaries (e.g., edges) of the respective geometric feature 54 on which the search box 60 is positioned. A size of the boundary exclusion 76 may be a user-defined parameter, and the present disclosure is not limited to any particular value for the boundary exclusion 76.

Step 908 may include identifying correspondence between geometric features 52 of the 3D component model 36 and geometric features 54 of the 3D manufacturing model 38. Correspondence between the geometric features 52 and the geometric features 54 may be identified by determining that a geometric feature 52 is found within the search box 60 for a geometric feature 54. As can be understood from FIG. 10, for example, correspondence may be identified between a first geometric feature 52A of the 3D component model 36 and a first geometric feature 54A of the 3D manufacturing model 38. Correspondence may also be identified between a second geometric feature 52B of the 3D component model 36 and a second geometric feature 54B of the 3D manufacturing model 38. Correspondence may also be identified between a third geometric feature 52C of the 3D component model 36 and a third geometric feature 54C of the 3D manufacturing model 38. Step 908 may include identifying that there is no correspondence for a particular geometric feature 54 of the 3D manufacturing model 38. For example, there are no geometric features 52 of the 3D component model 36 found in the search box 60 for a fourth geometric feature 54D of the 3D manufacturing model 38. Accordingly, the fourth geometric feature 54D of the 3D manufacturing model 38 of FIG. 10 may be understood to have no correspondence with respect to the 3D component model 36. FIG. 10 illustrates a single geometric feature 52 of the 3D component model 36 in the search box 60 associated with each of the geometric features 54A, 54B, 54C of FIG. 10. However, it should be understood that there may be more than one geometric feature 52 of the 3D component model 36 present in the search box 60 for a respective geometric feature 54 of the 3D manufacturing model 38 and, therefore, correspondence may be identified between a geometric feature 54 and more than one geometric feature 52.

Step 910 may include determining or otherwise measuring distances between a geometric feature 52 of the 3D component model 36 and a geometric feature 54 of the 3D manufacturing model 38. Distances may be measured between a geometric feature 52 of the 3D component model 36 and a geometric feature 54 of the 3D manufacturing model 38 for which correspondence has been identified (see Step 908). For example, distances between the 3D component model 36 and the 3D manufacturing model 38 in a superimposed condition (see FIG. 10) may be determined for one or more points along geometric features 52, 54 of the 3D component model 36 and the 3D manufacturing model 38.

Figure 11:
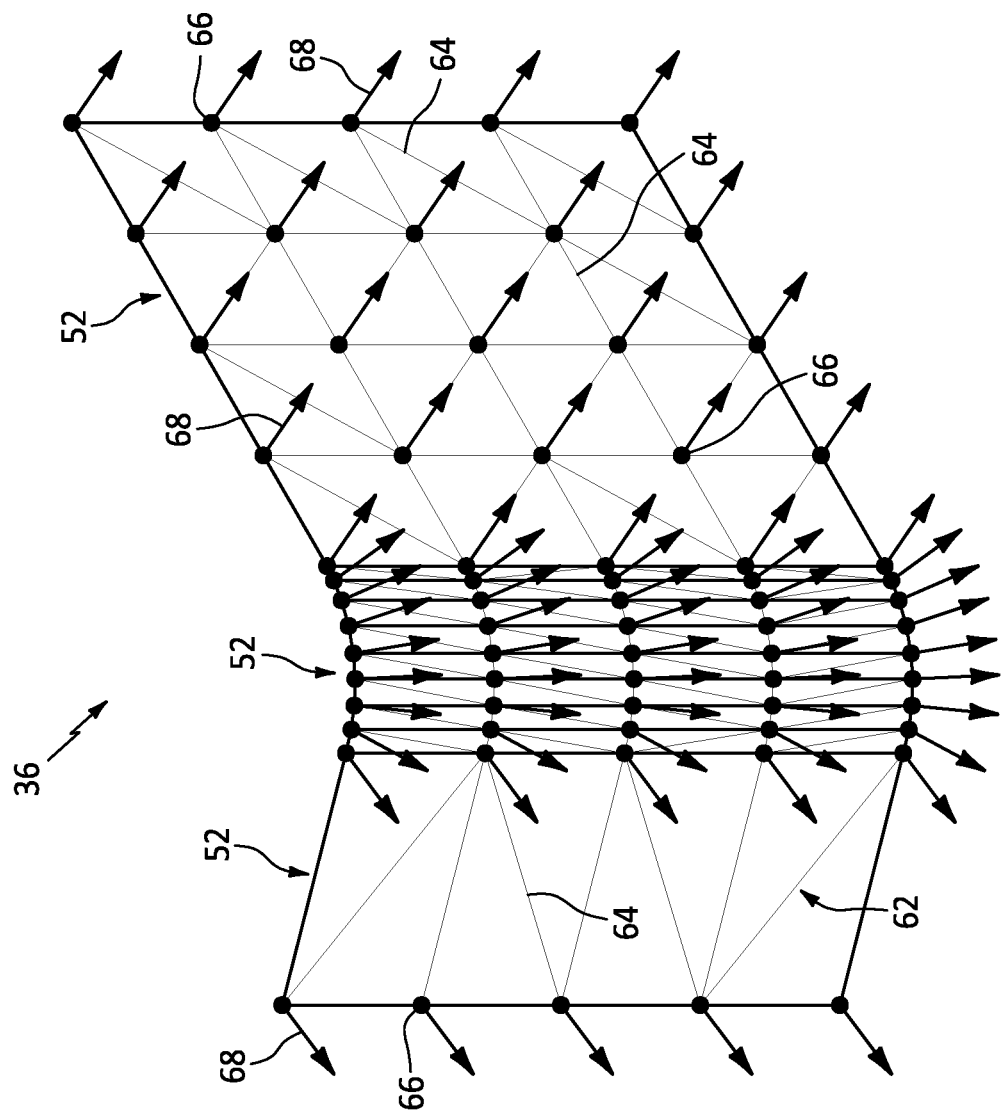
FIG. 11 illustrate geometric features of a 3D component model, in accordance with one or more embodiments of the present disclosure.

In one example, Step 910 may include overlaying a mesh pattern 62 on one or more geometric features 52 of the 3D component model 38 in the CAD environment. FIG. 11 illustrates an exemplary mesh pattern 62 overlaid on a 3D component model 36. The mesh pattern 62 may include a plurality of interconnecting lines 64. Each of the interconnecting lines 64 may intersect another of the interconnecting lines 64 at a mesh point 66 of the mesh pattern 62. The interconnecting lines 64 may form a plurality of geometric shapes on the geometric features 52 of the 3D component model 36. For example, the interconnecting lines 64 of FIG. 11 form a series of triangles on the geometric features 52 of FIG. 11. The present disclosure, however, is not limited to any particular orientation of the interconnecting lines 64 relative to one another or to any resultant geometric shapes formed by the interconnecting lines 64. Mesh points 66 of the mesh pattern 62 which are disposed within a boundary exclusion 76 (see FIG. 10) applied to the geometric feature 54 may be discarded to facilitate accurate association of the mesh points 66 with the geometric feature 52 on which the mesh pattern 62 is overlayed.

Figure 12:
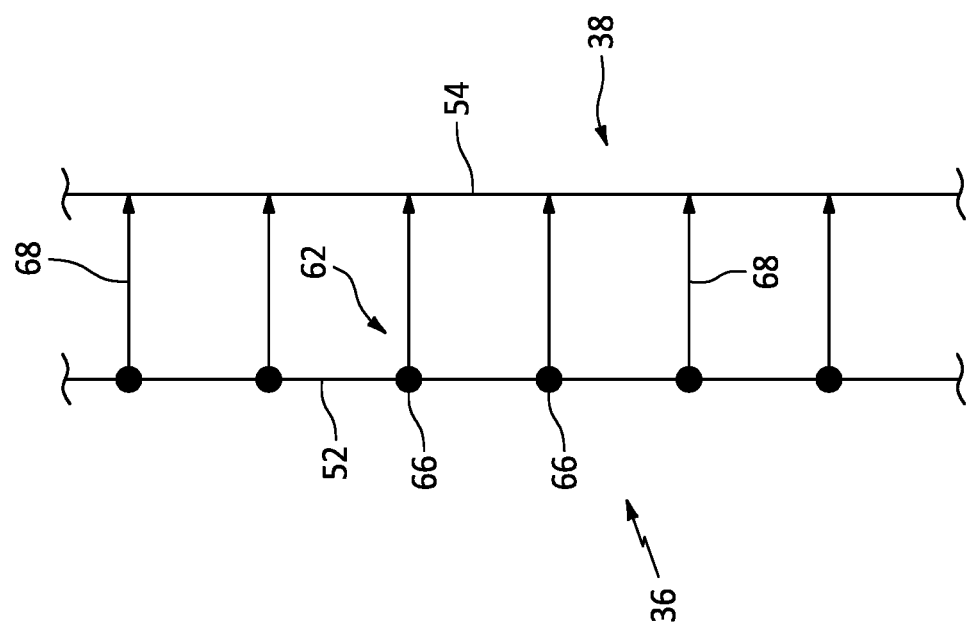
FIG. 12 illustrates a side view of a 3D component model surface and a 3D manufacturing model surface, in accordance with one or more embodiments of the present disclosure.

Step 910 may include measuring a distance from each mesh point 66 to the 3D manufacturing model 38. For example, the distance from each mesh point 66 to the 3D manufacturing model 38 may be measured by generating a plurality of mesh vectors 68 of the mesh pattern 62. FIGS. 11 and 12 illustrate a plurality of mesh vectors 68 for the mesh pattern 62. As shown in FIG. 12, each mesh vector 68 extends from a respective mesh point 66 to the 3D manufacturing model 38. The magnitude of each mesh vector 68 may be identified as a distance between a respective mesh point 66 for a geometric feature 52 and a point of a corresponding geometric feature 54. As shown in FIGS. 11 and 12, the mesh vectors 68 may extend substantially orthogonal from a geometric feature 52 (e.g., a surface) of the 3D component model 36, however, the mesh vectors 68 are not limited to this particular orientation. The magnitude (e.g., distance) associated with each mesh vector 68 may be stored, for example, in the database 24 and/or memory 30 (see FIG. 1).

Step 912 may include identifying an association between a geometric feature 52 of the 3D component model 36 and a corresponding geometric feature 54 of the 3D manufacturing model 38. An association may identify, for example, a relationship based on a magnitude of the measured distances for corresponding geometric features 52, 54 relative to manufacturing tolerances for a related geometric feature of a component represented by the 3D component model. Identifying an association may be based on the measured distances between a geometric feature 52 of the 3D component model 36 and a geometric feature 54 of the 3D manufacturing model 38 (see Step 910). An association may include one of a plurality of association types. Association types may include, for example, (1) a match, (2) a deviation from nominal, (3) a machining allowance, and/or (4) no match. The identified association types for corresponding geometric features 52, 54 may be used in the identification, development, or modeling of PMI (e.g., manufacturing tolerances) for the geometric features 54 of the 3D manufacturing models 38. The 3D manufacturing models 38 and associated PMI may be used, for example, to develop manufacturing processes for components represented by the 3D component model 36 and/or to perform inspections of components at various stages of manufacture.

A match association between a geometric feature 52 and a corresponding geometric feature 54 may indicate that a distance between the geometric feature 52 and the corresponding geometric feature 54 is zero. For corresponding geometric features 52, 54 having a match association, Step 912 may include applying PMI (e.g., a machining tolerance) associated with the geometric feature 52 of the 3D component model 36 to the corresponding geometric feature 54 of the 3D manufacturing model 38. A deviation from nominal association between a geometric feature 52 and a corresponding geometric feature 54 may indicate that a distance between the geometric feature 52 and the corresponding geometric feature 54 is relatively small (e.g., less than a final manufacturing tolerance for the geometric feature 52). For corresponding geometric features 52, 54 having a deviation from nominal association, Step 912 may include prompting a user to confirm that PMI (e.g., a machining tolerance) associated with the geometric feature 52 of the 3D component model 36 may (or may not) be applied to the corresponding geometric feature 54 of the 3D manufacturing model 38. Alternatively, the PMI for the geometric feature 52 may be modified based on an amount of the deviation (e.g., distance) for the corresponding geometric features 52, 54, and subsequently applied to the corresponding geometric feature 54 of the 3D manufacturing model 38. For example, a manufacturing tolerance for the geometric feature 52 may be shifted or otherwise modified by an amount of the deviation (e.g., distance) for the corresponding geometric features 52, 54. A machining allowance association between a geometric feature 52 and a corresponding geometric feature 54 may indicate that a distance between the geometric feature 52 and the corresponding geometric feature 54 is relatively large (e.g., greater than a final manufacturing tolerance for the geometric feature 52). The machining allowance association may indicate that one or more additional machining steps may be necessary to form a component represented by the 3D component model 36 from an intermediate component represented by the 3D manufacturing model 38. In this case, the PMI (e.g., a machining tolerance) associated with the geometric feature 52 of the 3D component model 36 may not be applied to the corresponding geometric feature 54 of the 3D manufacturing model 38. Instead, Step 912 may include prompting a user to manually input one or more manufacturing tolerances for the corresponding geometric feature 54 of the 3D manufacturing model 38. The one or more manually-input manufacturing tolerances for the corresponding geometric feature 54 may be verified relative to the superimposed 3D component model 36 (see FIG. 10) to confirm that the manually-input manufacturing tolerances are consistent with the manufacturing tolerances for the 3D component model 36 (e.g., to ensure that the manually-input manufacturing tolerances will not allow too much material to be removed during a component manufacturing process). A no match association between a geometric feature 52 and a corresponding geometric feature 54 may indicate that the geometric feature 54 represents a temporary geometric feature of an intermediate component required for manufacturing (e.g., a temporary geometric feature which will not be present for a final component represented by the 3D component model 36), and that PMI for the geometric feature 52 will not be relevant to the corresponding geometric feature 54.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for identifying a geometric feature association for a three-dimensional (3D) component model and a 3D manufacturing model, the method comprising:
superimposing the 3D manufacturing model on the 3D component model in a computer-aided drafting (CAD) environment;
identifying correspondence between a first geometric feature of the 3D component model and a second geometric feature of the superimposed 3D manufacturing model, wherein identifying correspondence between the first geometric feature of the 3D component model and the second geometric feature of the superimposed 3D manufacturing model includes generating a search box positioned on the second geometric feature and identifying that the first geometric feature is located within the search box;
measuring at least one distance between the first geometric feature and the second geometric feature based on the identified correspondence between the first geometric feature of the 3D component model and the second geometric feature of the superimposed 3D manufacturing model; and
identifying an association between the first geometric feature and the second geometric feature based on the at least one measured distance, wherein the association includes an association type between the first geometric feature and the second geometric feature based on the at least one measured distance, the association type including one or more of: a match, a deviation from nominal, a machining allowance or no match;
wherein the 3D component model is representative of a component in a manufactured condition, and the 3D manufacturing model is representative of the component in an intermediate state of manufacture.

2. The method of claim 1, further comprising applying product manufacturing information (PMI) associated with the first geometric feature to the second geometric feature based on the identified association.

3. The method of claim 1, wherein superimposing the 3D manufacturing model on the 3D component model includes aligning a third geometric feature of the 3D manufacturing model with a fourth geometric feature of the 3D component model.

4. The method of claim 3, wherein the third geometric feature is a center axis of the 3D manufacturing model and the fourth geometric feature is a center axis of the 3D component model.

5. The method of claim 1, wherein measuring the at least one distance between the first geometric feature and the second geometric feature includes:
   overlaying a mesh pattern on the first geometric feature, the mesh pattern including a plurality of mesh points; and
   measuring a vector distance from each mesh point of the plurality of mesh points to the second geometric feature.

6. The method of claim 1, wherein identifying the association between the first geometric feature and the second geometric feature includes identifying that the measured at least one distance is less than a final manufacturing tolerance for a component represented by the 3D component model.

7. The method of claim 1, wherein identifying the association between the first geometric feature and the second geometric feature includes identifying that the measured at least one distance is greater than a final manufacturing tolerance for a component represented by the 3D component model.

8. The method of claim 1, further comprising indexing the first geometric feature in a database by assigning the first geometric feature a unique identification (ID).

9. The method of claim 1, wherein each of the first geometric feature and the second geometric feature is a surface.

10. The method of claim 1, wherein the search box is centered on the second geometric feature such that a first half of a search distance extends between the second geometric feature and a minimum search end, and a second half of the search distance extends between the second geometric feature and a maximum search end.

11. The method of claim 1, wherein generating the search box includes applying a boundary exclusion parameter to the search box, the boundary exclusion applied to the second geometric feature to separate the search box from a boundary of the second geometric feature.

12. A system for identifying a geometric feature association for a three-dimensional (3D) component model and a 3D manufacturing model, the system comprising:
   a processor; and
   a non-transitory memory in signal communication with the processor, the non-transitory memory storing instructions which, when executed, cause the processor to:
      superimpose the 3D manufacturing model on the 3D component model in a computer-aided drafting (CAD) environment;
      identify correspondence between a first geometric feature of the 3D component model and a second geometric feature of the superimposed 3D manufacturing model prior to measuring the at least one distance, wherein identifying correspondence between the first geometric feature of the 3D component model and the second geometric feature of the superimposed 3D manufacturing model includes generating a search box centered on the second geometric feature, and identifying that the first geometric feature is located within the search box;
      measure at least one distance between the first geometric feature of the 3D component model and the second geometric feature of the superimposed 3D manufacturing model; and
      identify an association between the first geometric feature and the second geometric feature based on the at least one measured distance and a final manufacturing tolerance for a component represented by the 3D component model, wherein the association includes an association type between the first geometric feature and the second geometric feature based on the at least one measured distance, the association type including one or more of: a match, a deviation from nominal, a machining allowance or no match;
      wherein the 3D component model is representative of a component in a manufactured condition, and the 3D manufacturing model is representative of the component in an intermediate state of manufacture.

13. The system of claim 12, further comprising a database in signal communication with the processor, the database storing manufacturing data for the first geometric feature, and the instructions, when executed, further cause the processor to:
   identify the manufacturing data of the first geometric feature using a unique identification (ID) assigned to the first geometric feature.

14. A method for identifying a geometric feature association for a three-dimensional (3D) component model and a 3D manufacturing model, the 3D component model including a plurality of first geometric features, the 3D manufacturing model including a plurality of second geometric features, the method comprising:
   superimposing the 3D manufacturing model on the 3D component model in a computer-aided drafting (CAD) environment;
   identifying correspondence for each second geometric feature by positioning a search box on each second geometric feature and identifying one or more first geometric features located within the search box for each second geometric feature, wherein positioning the search box includes applying a boundary exclusion parameter to the search box, the boundary exclusion applied to each second geometric feature to separate the search box from an edge of each second geometric feature;
   measuring, for each second geometric feature, at least one distance between the respective second geometric feature and any identified corresponding first geometric features for the respective second geometric feature based on the identified one or more geometric features located within the search box for each second geometric feature; and
   identifying, for each second geometric feature, an association between the respective second geometric feature and the any identified corresponding first geometric features for the respective second geometric feature based on the at least one measured distance
   wherein the 3D component model is representative of a component in a manufactured condition, and the 3D manufacturing model is representative of the component in an intermediate state of manufacture.

15. The method of claim 14, wherein each second geometric feature is a surface.

16. The method of claim 14, wherein each first geometric feature of the plurality of first geometric features is identified in a database by a respective unique identification (ID).

17. The method of claim 14, wherein measuring the at least one distance between the respective second geometric feature and the any identified corresponding first geometric features for the respective second geometric feature includes:
- overlaying a mesh pattern on each of the any identified corresponding first geometric features, the mesh pattern including a plurality of mesh points; and
- measuring a vector distance from each mesh point of the plurality of mesh points to the second geometric feature.

18. The method of claim 14, wherein identifying the association between the respective second geometric feature and the any identified corresponding first geometric features for the respective second geometric feature includes identifying that the measured at least one distance is less than a final manufacturing tolerance for a component represented by the 3D component model.

19. The method of claim 14, wherein identifying the association between the respective second geometric feature and the any identified corresponding first geometric features for the respective second geometric feature includes identifying that the measured at least one distance is greater than a final manufacturing tolerance for a component represented by the 3D component model.

* * * * *